(12) United States Patent
Maartens et al.

(10) Patent No.: US 7,186,331 B2
(45) Date of Patent: Mar. 6, 2007

(54) MONITORING UNIT FOR MONITORING THE CONDITION OF A SEMI-PERMEABLE MEMBRANE

(75) Inventors: André Maartens, Evander (ZA); Edmund Petrus Jacobz, Stellenbosch (ZA); Douglas Peet, Somerset West (ZA); Petronella Maria Augustyn, Secunda (ZA)

(73) Assignee: Sasol Technology (Pty) Limited, Sasolburg (ZA)

( * ) Notice: Subject to any disclaimer, the term of this patent is extended or adjusted under 35 U.S.C. 154(b) by 434 days.

(21) Appl. No.: 10/090,802

(22) Filed: Mar. 6, 2002

(65) Prior Publication Data

US 2002/0134716 A1   Sep. 26, 2002

(30) Foreign Application Priority Data

Mar. 6, 2001   (ZA) .................................. 2001/1855

(51) Int. Cl.
 *B01D 35/00*   (2006.01)
 *B01D 63/00*   (2006.01)
 *B01D 35/14*   (2006.01)

(52) U.S. Cl. ............................ 210/90; 210/85; 210/94; 210/321.75; 210/321.74; 210/97; 210/137; 210/456; 210/321.6

(58) Field of Classification Search .............. 210/222, 210/85, 90, 94, 231, 321.75, 321.74, 97, 210/137, 456, 321.6, 257.2, 195.2, 652
See application file for complete search history.

(56) References Cited

U.S. PATENT DOCUMENTS

| | | | | |
|---|---|---|---|---|
| 3,133,132 A | * | 5/1964 | Loeb et al. .................... 264/49 |
| 3,703,959 A | * | 11/1972 | Raymond ..................... 210/87 |
| 4,218,313 A | * | 8/1980 | Aid et al. .................... 210/650 |
| 4,375,415 A | * | 3/1983 | Lavender ..................... 210/651 |
| 4,438,052 A | * | 3/1984 | Weder et al. ................. 264/4.6 |
| 4,818,385 A | * | 4/1989 | Medley, III ................... 210/90 |
| 4,855,058 A | * | 8/1989 | Holland et al. ............. 210/652 |
| 4,990,256 A | * | 2/1991 | Schmidt ..................... 210/636 |
| 5,096,582 A | * | 3/1992 | Lombardi et al. ....... 210/321.6 |
| 5,476,586 A | * | 12/1995 | Mayeaux ..................... 210/446 |
| 5,599,447 A | * | 2/1997 | Pearl et al. ............ 210/321.75 |
| 5,914,042 A | * | 6/1999 | Ball et al. .................... 210/650 |

(Continued)

*Primary Examiner*—Ana Fortuna
(74) *Attorney, Agent, or Firm*—Finnegan, Henderson, Farabow, Garrett, & Dunner, L.L.P.

(57) ABSTRACT

The invention concerns a monitoring unit [10] for monitoring the condition of a semi-permeable membrane [24] in a water purification system, and particularly the condition of spiral membrane in a reverse osmosis water purification system. The monitoring unit [10] comprises a flow chamber [12] that includes an inlet for permitting ingress of a feed fluid into the flow chamber [12], and a feed fluid outlet [22] for permitting at least partial through-flow of the feed fluid through the flow chamber [12] such that cross-flow conditions apply in the flow chamber [12]. The semi-permeable membrane [24] is at least partly supported in the flow chamber [12]. The monitoring unit [10] further comprises at least one fluid outlet [18] arranged in fluid communication with the flow chamber [12] for permitting egress of fluid from the monitoring unit [10] after having passed through the membrane [24]; and an inspection window [20] for permitting visual inspection of the semi-permeable membrane [24]. The invention also extends to the use of such a monitoring unit [10] in evaluating various operating parameters of such a system, and to a water purification system including such a monitoring unit [10] or test cell.

33 Claims, 3 Drawing Sheets

U.S. PATENT DOCUMENTS 6,017,459 A * 1/2000 Zeiher et al. ................ 210/650
6,161,435 A * 12/2000 Bond et al. .................... 73/587
6,312,591 B1 * 11/2001 Vassarotti et al. ........ 210/195.2
6,939,515 B2 * 9/2005 Carlson et al. ............. 422/101

* cited by examiner

MONITORING UNIT FOR MONITORING THE CONDITION OF A SEMI-PERMEABLE MEMBRANE

INTRODUCTION

This invention relates to an apparatus for monitoring performance of a water purification system. Particularly, the invention relates to a monitoring unit or test cell for monitoring fouling and biofouling of semi-permeable reverse osmosis membranes utilized in water purification systems. The invention also extends to the use of such a monitoring unit in evaluating various operating parameters of such a system, and to a water purification system including such a monitoring unit or test cell.

BACKGROUND OF THE INVENTION

Those who are familiar with the industry will appreciate that a reverse osmosis water purification system provides for cleaning an impure aqueous solution by forcing the solution through a semi-permeable membrane to obtain a substantially pure aqueous solution. More particularly, an impure aqueous solution is generally pumped, under pressure, through the semi-permeable membrane, which is designed for retaining impurities such as organic and inorganic substances, thereby effecting passage only of the substantially pure aqueous solution through the membrane.

The life span of such a reverse osmosis water purification system is largely dependent on the efficiency of the semi-permeable membrane. Over a period of time, the membrane's efficiency decreases due to adsorption of impurities on the membrane surface. Moreover, uncontrolled microbiological growth in a feed fluid tank, pipelines or on the membranes themselves can result in severe biofouling of the semi-permeable membrane. If this situation is detected in time, the membranes can be cleaned, for example by mechanical or chemical treatment processes. However, a major problem associated with this type of technology is the lack of methodology by which fouling or biofouling of the membrane is detected and monitored. If the membrane is not cleaned in time, the membrane can be damaged permanently, unavoidably resulting in downtime of the system, associated production losses, and expensive maintenance and replacement costs for replacing the membrane.

Apparatus have been developed in an attempt to detect fouling of the semi-permeable membrane in time, but these all suffer from one or more disadvantages. One such apparatus provides for monitoring fouling of the membrane, and hence performance of a reverse osmosis water purification system, by comparing electrical conductivity of an impure aqueous solution at an inlet side of the membrane with that of a substantially purified aqueous solution at an outlet side of the membrane.

Another known apparatus involves utilizing a centrifugal pump for increasing fluid pressure of a feed fluid to a value exceeding that of its osmotic pressure. Fouling of the semi-permeable membrane and performance of the water purification system is then monitored by means of three monitoring devices; one device for monitoring performance of the centrifugal pump; another for monitoring performance of a reverse osmosis apparatus incorporated in the system; and yet a further device for monitoring performance of fluid channels within the system. The monitoring devices generally determine respective pressure losses of fluid flow through the three apparatus and then compare the same with ideal operating conditions.

Yet a further apparatus provides for monitoring fluid pressure at an outlet end of the semi-permeable membrane and defining a correlation between a drop in such fluid pressure over a period of time, and the associated extent of fouling of the membrane.

It is apparent that most existing apparatus for detecting fouling of the semi-permeable membrane depend mainly on changes in fluid pressure or permeate flux of the membrane system. One disadvantage associated with these types of apparatus is that relatively complicated valve and pressure sensor arrangements are required to effect proper working of the apparatus. Another disadvantage is that the apparatus generally comprises a number of separate components that not only increases manufacturing, installation and maintenance costs, but also requires relatively skilled personnel for operating the apparatus. Furthermore, it has been found that existing apparatus are often not sensitive enough for detecting fouling of the membrane in time, the situation being such that by the time fouling is eventually detected, the membrane is already damaged.

OBJECT OF THE INVENTION

It is accordingly an object of the present invention to provide a novel apparatus for monitoring the condition of a semi-permeable membrane, especially of the type utilized in a reverse osmosis water purification system, that will overcome or at least minimize some of the disadvantages associated with known apparatus of this kind.

It is a further object of the invention to provide for use of such an apparatus for evaluating and comparing different operational parameters of a reverse osmosis water purification system.

It is yet a further object of the invention to provide a water purification system including the novel apparatus for monitoring the condition of a semi-permeable membrane.

SUMMARY OF THE INVENTION

According to the invention there is provided a monitoring unit for monitoring the condition of a semi-permeable membrane, the monitoring unit comprising a flow chamber having an inlet for permitting ingress of a feed fluid into the flow chamber, the arrangement being such that the membrane is at least partly supported in the flow chamber; at least one fluid outlet arranged in fluid communication with the flow chamber for permitting egress of fluid from the monitoring unit after having passed through the membrane; and an inspection window for permitting visual inspection of the semi-permeable membrane.

The monitoring unit particularly may be adapted for monitoring fouling of the semi-permeable membrane. For the purpose of this specification, "fouling" will be interpreted to include organic fouling, inorganic fouling, biofouling or the like accretion of impurities such as precipitates, scale or the like particulate matter on a surface of the semi-permeable membrane. Furthermore, the term "feed fluid" will be interpreted to mean substantially impure fluid introduced into the flow chamber, whereas the term "fluid" will mean substantially pure fluid having passed through the semi-permeable membrane and exiting the monitoring unit.

The flow chamber may include a feed fluid outlet for permitting at least partial through-flow of the feed fluid through the flow chamber. In particular, cross-flow conditions may apply in the flow chamber. The flow chamber may be dimensioned such that a fluid pressure interval is defined intermediate the feed fluid inlet and the feed fluid outlet.

Particularly, fluid pressure at the feed fluid outlet may be less than that at the feed fluid inlet such that, in use, the feed fluid partly exits through the feed fluid outlet of the flow chamber and in part passes through the semi-permeable membrane.

The monitoring unit also may comprise a fluid permeable support member for supporting the semi-permeable membrane in the flow chamber. The support member may constitute a base portion of the flow chamber, the arrangement being such that feed fluid entering the flow chamber passes at least in part through the support member. The support member may be of any suitable porous material such as high-density polyethylene, stainless steel, brass, finely woven fiber or the like. The support member may include pores of pore sizes between 10 and 150 µm.

The monitoring unit further may include spacer means for spacing the semi-permeable membrane from the support member so as to provide a flow space between the membrane and the support member, or between adjacent membranes on the support member. The monitoring unit may accommodate different spacers that vary in thickness and shape, the arrangement being such that different spacers influence fluid dynamics of the feed fluid flowing across the semi-permeable membrane. So, for example, the monitoring unit may include a spacer that is locatable intermediate the semi-permeable membrane and the support member that is similar to a permeate-side spacer generally used in construction of spiral wrap elements. Also, for example, the monitoring unit may include a feed-side spacer similar to that used in construction of spiral elements in use, wherein the feed-side spacer may be locatable on top of the semi-permeable membrane. It will be appreciated that specific spacer configurations affect the adsorption kinetics of fouling substances in the feed fluid and since the monitoring unit has the potential to include different types of spacers, it includes the expanded potential for using the same to evaluate spacer technology.

The fluid outlet may be arranged in fluid communication with the support member such that fluid that has passed through the membrane and the support member exits the monitoring unit through the fluid outlet. The fluid outlet may be arranged in fluid communication with a suitable conduit for passing the fluid through the water purification system.

The inspection window may be oriented substantially parallel to and somewhat spaced from the support member, the arrangement being such that the flow chamber is defined intermediate the support member and the inspection window. The inspection window may be of any suitable transparent material, such as plastics, Perspex, glass or the like, and may be characterized therein that it can withstand a pressure of at least between 40 and 50 bar.

The monitoring unit may include regulating means for regulating flow across the membrane, as well as fluid pressure in the unit. Particularly, the regulating means may be at least one valve suitably arranged for regulating the fluid pressure interval intermediate the feed fluid inlet and the feed fluid outlet. In one form of the invention, the monitoring unit may include at least one feed fluid inlet valve operatively associated with the feed fluid inlet. The monitoring unit also may include a feed fluid outlet valve operatively associated with the feed fluid outlet of the flow chamber. It is envisaged that the fluid outlet adjacent the support member also may include a suitable fluid outlet valve.

In use, the regulating means may permit repeatable or standard conditions, such as a constant cross-flow velocity and fluid pressure. By maintaining flow and pressure constant through the monitoring unit, flux or passage of pure water through the semi-permeable membrane can be measured. Any deviation in the flux through the membrane can then be attributed to adsorption of impurities onto the membrane (fouling or biofouling), which changes the permeability characteristic of the membrane.

In one form of the invention, the monitoring unit may operatively be associated with pumping means for further manipulating fluid pressure in the monitoring unit. More particularly, the monitoring unit may operatively be associated with a positive displacement pump arranged in-line with the monitoring unit and suitable for maintaining the fluid pressure interval intermediate the feed fluid inlet and outlet of the flow chamber.

The monitoring unit further may -include flow distribution means. The flow distribution means may be in the form of a manifold dimensioned for preventing turbulence within the flow chamber and for effecting homogenous fluid flow.

In one form of the invention, the monitoring unit may include an inlet manifold arranged intermediate the feed fluid inlet and the flow chamber for regulating flow of feed fluid into the flow chamber.

The monitoring unit also may include an outlet manifold located intermediate the flow chamber and the feed fluid outlet. The outlet manifold may be arranged such that it prevents areas of decreased flow in the flow chamber, so as to prevent preferential foulant adsorption or biological growth. The manifolds also may be arranged so as to permit reverse flow through the monitoring unit for evaluating the effectiveness of back flushing on removal of impurities adsorbed onto the membranes.

The monitoring unit further may comprise a casing. The casing may include top cover means and bottom cover means that releasably may be connected to each other in fluid-tight and pressure-tight engagement, the arrangement being such that the inspection window, flow chamber and support member are located substantially intermediate the top and bottom cover means. The casing may be of stainless steel or the like suitable material.

The top cover means may comprise a metallic frame dimensioned so as at least partially to frame the inspection window. The bottom cover means may comprise a metallic sheet recessed at least partially to accommodate the flow chamber, the support member and the fluid outlet.

The monitoring unit may be adapted for monitoring fouling of a semi-permeable membrane during operation of a water purification system. In particular, the monitoring unit may be characterized therein that it comprises the potential of simulating conventional fluid dynamics associated with these types of membranes across the spacer means and support member. Consequently, the monitoring unit may be dimensioned such that conventional operating conditions of the water purification system are simulated in the monitoring unit. Particularly, the monitoring unit may operate at a fluid pressure corresponding to that of the water purification system. More particularly, the monitoring unit may operate at a fluid pressure of between 40 and 50 bar.

The monitoring unit may be located inline with a conventional reverse osmosis water purification system. The monitoring unit particularly may be adapted for monitoring fouling of a semi-permeable spiral membrane in a spiral reverse osmosis water purification system. In this form of the invention, the monitoring unit may be located intermediate a feed fluid tank and a spiral membrane plant of the spiral reverse osmosis water purification system.

According to another aspect of the invention there is provided a method of monitoring fouling of a semi-permeable membrane in a water purification system, the method comprising the steps of providing a monitoring unit according to the invention; placing at least one semi-permeable test membrane on the fluid permeable support member; effecting at least partial passage of feed fluid through the test membrane; and visually monitoring fouling of the test membrane through the inspection window as an indicating means for determining fouling of the semi-permeable membrane in the water purification system.

The method may concern monitoring fouling of the semi-permeable membrane during operation of the water purification system. Consequently, the method may comprise the step of effecting at least partial passage of feed fluid through the membrane under conventional system operating conditions. The method particularly may concern monitoring fouling of a semi-permeable spiral membrane in a spiral reverse osmosis water purification system.

The test membrane may removably be placed on the support member. The test membrane may be spaced from the support member by means of spacer means. A number of test membranes may be placed on the support member in spaced orientation relative to each other.

The test membrane may be any suitable flat-sheet semi-permeable membrane, such as a micro-filtration, ultra-filtration, nanno-filtration or the like reverse osmosis membrane. In particular, any type of flat-sheet semi-permeable membrane associated with a polymeric support material may be used in the monitoring unit. Different types of polymeric materials used for the construction of these membranes may be used.

Fouling of the test membrane also may be monitored by means of suitable monitoring equipment, such as by means of laser beam or infrared refraction, or sound acoustics.

According to yet a further aspect of the invention there is provided the use of a monitoring unit including a semi-permeable test membrane for evaluating one or more of the following operating parameters in a water purification system namely the efficiency of different types of chemicals utilized in the system, such as anti-scalants, biocides and anti-fouling chemicals; the effect of using different membranes and/or associated spacer means in the water purification system on the operating efficiency of the system; and efficiency of different membrane cleaning methods.

According to yet another aspect of the invention there is provided the use of a monitoring unit according to the invention for evaluating one or more of the following parameters in a spiral membrane reverse osmosis water purification system namely fouling of the spiral membrane; the efficiency of different types of chemicals utilized in the system, such as anti-scalants, biocides and anti-fouling chemicals; the effect of using different membranes and/or associated spacer means in the water purification system on the operating efficiency of the system; and efficiency of different membrane cleaning methods.

According to yet a further aspect of the invention there is provided a water purification system including at least one water-cleaning unit, the water purification system characterized therein that it includes a monitoring unit that comprises a flow chamber having an inlet for permitting ingress of a feed fluid into the flow chamber; a fluid permeable support member for supporting the semi-permeable membrane in the flow chamber; at least one fluid outlet arranged in fluid communication with the support member for permitting egress of fluid from the monitoring unit after having passed through the membrane; and an inspection window for permitting visual inspection of the semi-permeable membrane in use supported by the support member.

According to yet a further aspect of the invention there is provided the use of a monitoring unit according to the invention in a water purification system.

SPECIFIC EMBODIMENT OF THE INVENTION

Without limiting the scope thereof, one embodiment of the invention will now be described by way of example only and with reference to the accompanying drawings wherein FIG. 1 is a cross-sectional side view of a monitoring unit according to one embodiment of the invention;

Figure 1:
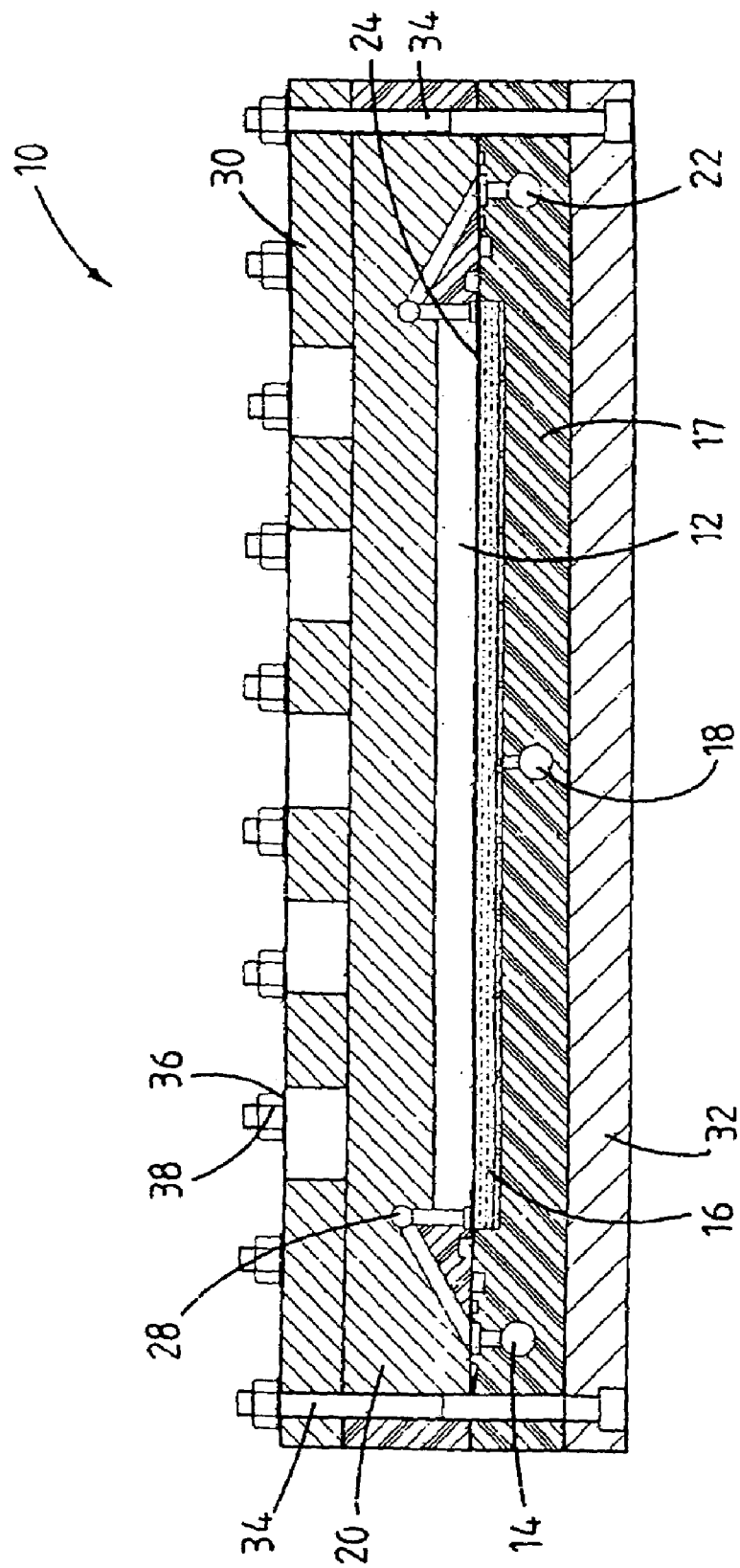
Figure 2:
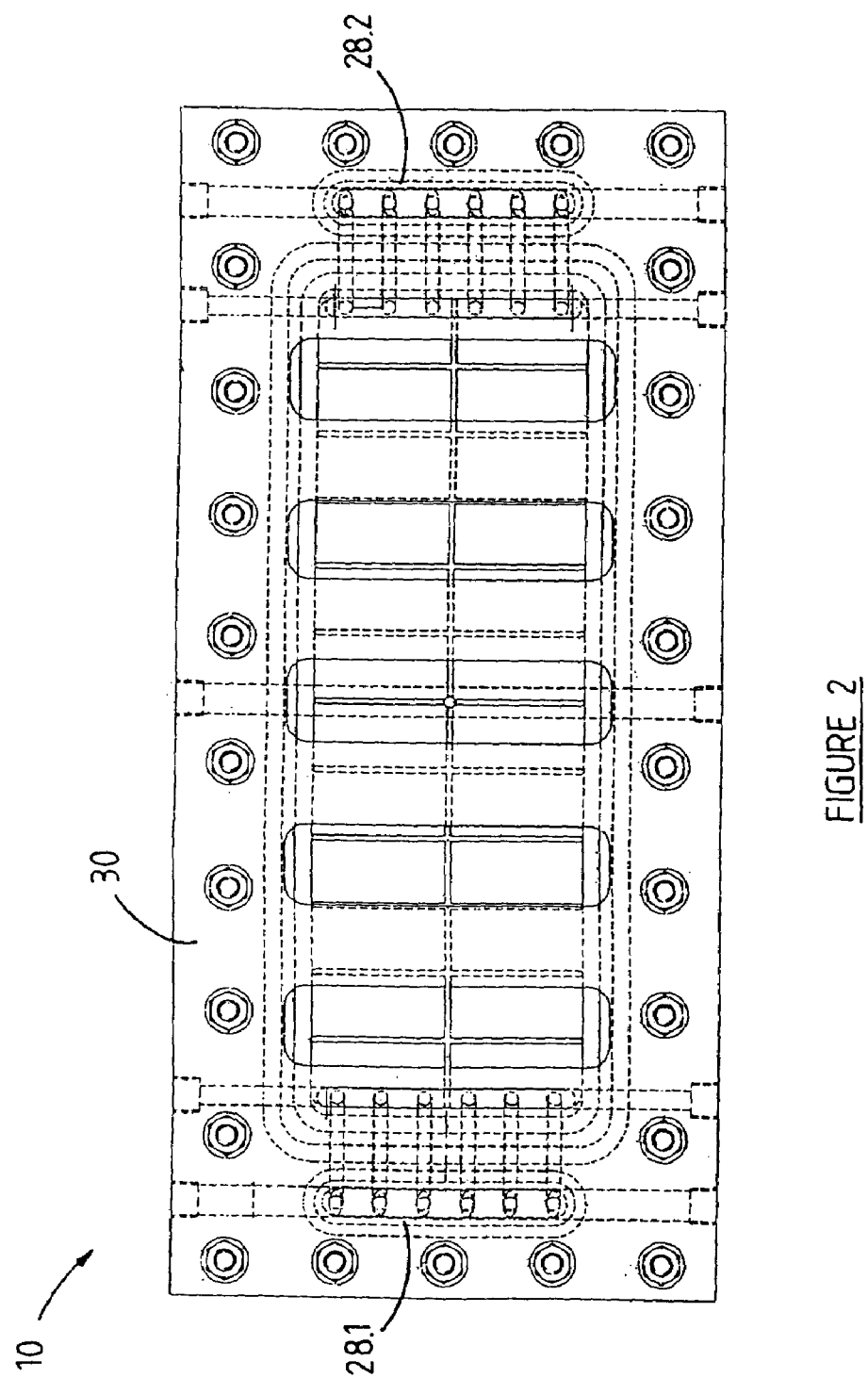
FIG. 2 is a plan view of the monitoring unit of FIG. 1.
Figure 3:
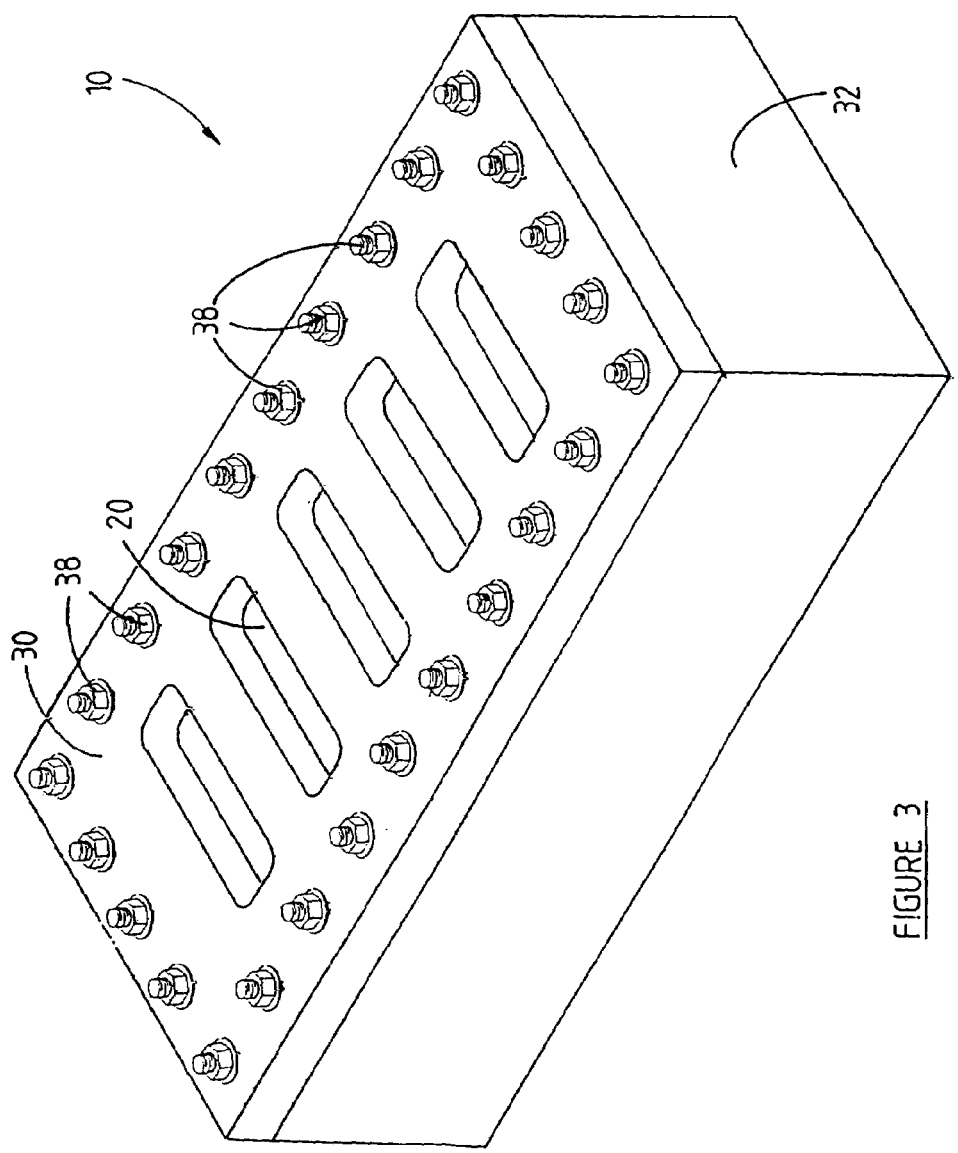
FIG. 3 is a perspective view of the monitoring unit of FIGS. 1 and 2.

A monitoring unit according to the invention is generally designated by reference numeral 10. The monitoring unit 10 is adapted for use in a water purification system that includes at least one water-cleaning unit wherein the water-cleaning unit comprises at least one membrane for cleaning water through reverse osmosis. Particularly, the monitoring unit 10 is adapted for monitoring the condition of a semi-permeable spiral membrane in a spiral membrane reverse osmosis water purification system by monitoring fouling of a semi-permeable test membrane 24 in the monitoring unit 10. It will be appreciated by those engaged in the industry that such a reverse osmosis water purification system often includes a series of successive water-cleaning units.

The monitoring unit 10 comprises a flow chamber 12 having a feed fluid inlet 14 for permitting ingress of a feed fluid into the flow chamber 12 and a feed fluid outlet 22 for permitting at least partial through-flow of the feed fluid through the flow chamber 12.

The flow chamber 12 is dimensioned such that a fluid pressure interval is defined intermediate the feed fluid inlet 14 and the feed fluid outlet 22. Particularly, fluid pressure at the feed fluid outlet 22 is less than that at the feed fluid inlet 14 such that, in use, feed fluid partly exits through the feed fluid outlet 22 of the flow chamber 12, and in part passes through the semi-permeable test membrane 24.

The monitoring unit 10 also comprises a fluid permeable support member 16 for supporting the semi-permeable test membrane 24 in the flow chamber 12. The support member 16 is located in a stainless steel bottom plate 17 in which a receiving aperture is machined for receiving the support member 16 in use. The support member 16 is arranged in fluid communication with a fluid outlet 18 for permitting egress of fluid from the monitoring unit 10 after having passed through the membrane. The support member 16 is a substantially porous member constituting a base portion of the flow chamber 12. In particular, the arrangement is such that feed fluid entering the flow chamber 12 passes at least in part through the support member 16.

The semi-permeable test membrane 24 is spaced from the support member 16 by means of a number of intermediate spacers (not shown). In particular, the test membrane 24 has an exposed surface area of approximately 10 cm×30 cm.

The monitoring unit 10 further comprises an inspection window 20 for permitting visual inspection of the semi-permeable test membrane 24 in use as supported by the support member 16. The inspection window 20 is oriented substantially parallel to and somewhat spaced from the support member 16 such that the flow chamber 12 is defined intermediate the support member 16 and the inspection window 20. The inspection window 20 is a sheet of any suitable transparent material, such as plastics, Perspex, glass or the like characterized therein that it is capable of withstanding a pressure of between 40 to 50 bar.

The support member 16 is arranged in fluid communication with a fluid outlet 18 which is located in the bottom plate 17, the arrangement being such that fluid that has passed through the test membrane 24 and the support member 16 exits the monitoring unit 10 through the fluid outlet 18. The fluid outlet 18 is arranged in fluid communication with a suitable conduit (not shown) for passing the fluid through the water purification system.

The monitoring unit 10 further includes regulating means for regulating fluid pressure in the monitoring unit 10. Particularly, the regulating means is a valve suitably arranged for regulating the fluid pressure interval intermediate the feed fluid inlet 14 and outlet 22.

The monitoring unit 10 further includes flow distribution means 28. The flow distribution means 28 is in the form of a manifold dimensioned for preventing turbulence within the flow chamber 12 and for effecting homogenous fluid flow. In the illustrated embodiment of the invention, the monitoring unit 10 includes an inlet manifold 28.1 arranged intermediate the feed fluid inlet 14 and the flow chamber 12 for regulating flow of feed fluid into the flow chamber 12. The monitoring unit 10 also includes an outlet manifold 28.2 located intermediate the flow chamber 12 and the feed fluid outlet 22.

The monitoring unit 10 further comprises a casing including top cover means 30 and bottom cover means 32 that are releasably connected to each other in fluid-tight and pressure-tight engagement by means of bolts 34 extending from the bottom cover means 32 and protruding through the top cover means 30. At one end thereof the bolts 34 are secured in place by means of washers 36 and nuts 38 dimensioned to accommodate the bolts 34. In particular, the arrangement is such that the inspection window 20, flow chamber 12 and support member 16 are located intermediate the top cover means 30 and bottom cover means 32. The casing is of stainless steel or the like suitable material.

The top cover means 30 comprises a metallic frame dimensioned so as at least partially to frame the inspection window 20. The bottom cover means 32 comprises a metallic sheet recessed at least partially to accommodate the support member 16 and the fluid outlet 18.

It will be appreciated that many other embodiments of the invention may be possible without departing from the spirit or scope of the invention as set out in the claims.

The invention claimed is:

1. A monitoring unit for monitoring the condition of a semi-permeable membrane, the monitoring unit comprising a flow chamber having a feed fluid inlet for permitting ingress of a feed fluid into the flow chamber; a fluid permeable support member for supporting a semi-permeable test membrane in the flow chamber, the support member constituting a base portion of the flow chamber such that feed fluid entering the flow chamber passes at least in part through the support member; at least one fluid outlet arranged in fluid communication with the flow chamber for permitting egress of fluid from the monitoring unit after having passed through the test membrane; and an inspection window for permitting visual inspection of the semi-permeable test membrane, the inspection window being oriented substantially parallel to and spaced from the support member such that the flow chamber is defined intermediate the support member and the inspection window; the monitoring unit being located in-line with a reverse osmosis water purification system having the semi permeable membrane intermediate a feed fluid tank and the semi-permeable membrane for monitoring fouling of the semi-permeable membrane.

2. The monitoring unit according to claim 1 further including a feed fluid outlet and wherein the flow chamber is dimensioned such that a fluid pressure interval is defined intermediate the feed fluid inlet and the feed fluid outlet.

3. The monitoring unit according to claim 2 wherein the fluid pressure at the feed fluid outlet is less than that at the feed fluid inlet such that, in use, the feed fluid partly exits through the feed fluid outlet of the flow chamber and in part passes through the semi-permeable test membrane.

4. The monitoring unit according to claim 1 wherein the support member is made of a high-density polyethylene, stainless steel, brass, or finely woven fiber porous material.

5. The monitoring unit according to claim 4 wherein the support member includes pores of pore sizes between 10 and 150 μm.

6. The monitoring unit according to claim 1 wherein the monitoring unit includes spacers for spacing the semi-permeable test membrane from the support member so as to provide a flow space between the test membrane and the support member.

7. The monitoring unit according to claim 6 wherein the monitoring unit comprises the potential of simulating, in the monitoring unit, fluid dynamics associated with the semi-permeable test membrane across the spacers and support member and is therefore adapted for monitoring fouling of the semi-permeable membrane during operation of the water purification system.

8. The monitoring unit according to claim 7 wherein the monitoring unit operates at a fluid pressure of between 40 and 50 bar.

9. The monitoring unit according to claim 6 wherein the monitoring unit further comprises at least a second semi-permeable test membrane adjacent the semi-permeable test membrane, and the spacers provide a flow space between the adjacent test membranes and the support member.

10. The monitoring unit according to either claim 6 or claim 9 wherein the monitoring unit accommodates different spacers that vary in thickness and shape, the arrangement being such that fluid dynamics of the feed fluid flowing across the semi-permeable test membrane are influenced through the use of different spacers.

11. The monitoring unit according to claim 1 wherein the fluid outlet is arranged in fluid communication with a conduit for passing the fluid through the semi-permeable membrane in the water purification system.

12. The monitoring unit according to claim 1 wherein the inspection window is made of a plastic, Perspex, or glass material, characterized therein that it can withstand a pressure of at least between 40 and 50 bar.

13. The monitoring unit according to claim 1 wherein the monitoring unit includes regulating means for regulating flow across the test membrane and, fluid pressure in the unit.

14. The monitoring unit according to claim 13 further including a feed fluid outlet and wherein the regulating means is at least one valve arranged for regulating the fluid pressure interval intermediate the feed fluid inlet and the feed fluid outlet.

15. The monitoring unit according to claim 14 wherein the monitoring unit includes at least one feed fluid inlet valve operatively associated with the feed fluid inlet; and at least one feed fluid outlet for passing fluid through the test membrane valve operatively associated with the feed fluid outlet of the flow chamber.

16. The monitoring unit according to either claim 14 or claim 15 wherein the monitoring unit includes at least one fluid outlet valve at the fluid outlet.

17. The monitoring unit according to claim 1 wherein the monitoring unit is operatively associated with pumping means for further manipulating fluid pressure in the monitoring unit.

18. The monitoring unit according to claim 17 further including a feed fluid outlet and wherein the pumping means is a positive displacement pump arranged in-line with the monitoring unit and suitable for maintaining the fluid pressure interval intermediate the feed fluid inlet and feed fluid outlet of the flow chamber.

19. The monitoring unit according to claim 1 wherein the monitoring unit includes flow distribution means in the form of a manifold dimensioned for preventing turbulence within the flow chamber and for effecting homogenous fluid flow.

20. The monitoring unit according to claim 19 wherein the monitoring is an inlet manifold arranged intermediate the feed fluid inlet and the flow chamber for regulating flow of feed fluid into the flow chamber.

21. The monitoring unit according to claim 19 wherein the monitoring unit includes a feed fluid outlet and an outlet manifold located intermediate the flow chamber and the feed fluid outlet, the outlet manifold being arranged such that it prevents areas of decreased flow in the flow chamber so as to prevent preferential foulant adsorption or biological growth.

22. The monitoring unit according to either claim 20 or claim 21 wherein the manifolds are arranged so as to permit reverse flow through the monitoring unit for evaluating the effectiveness of back flushing on removal of impurities adsorbed onto the test membrane.

23. The monitoring unit according to claim 1 wherein the semi-permeable membrane is a spiral reverse osmosis membrane for monitoring fouling of the spiral membrane in the water purification.

24. A method of monitoring fouling of a semi-permeable membrane in a water purification system, the method comprising the steps of: providing in line with the water purification system, intermediate a feed fluid tank and a membrane plant, a monitoring unit; the monitoring unit comprising a flow chamber having an inlet for permitting ingress of a feed fluid into the flow chamber, at least one fluid outlet arranged in fluid communication with the flow chamber for permitting egress of the of fluid from the monitoring unit after having passed through a semi-permeable test membrane provided within the chamber; and an inspection window for permitting visual inspection of the semi-permeable test membrane; wherein the semi-permeable test membrane placed on a fluid permeable support member; effecting at least partial passage of feed fluid through the test membrane; and visually monitoring fouling of the test membrane through the inspection window as indication of fouling of the semi-permeable membrane in the water purification system.

25. The method according to either claim 24 wherein the semi-permeable membrane is a reverse osmosis membrane.

26. The method according to claim 24 wherein the test membrane is removably placed on the support member and is spaced from the support member by spacers.

27. The method according to either claim 24 or claim 26 wherein the test membrane is a flat-sheet semi-permeable membrane and the support member is a polymeric support material.

28. The method according to claim 24 wherein fouling of the test membrane is also monitored by means of monitoring equipment, selected from the group consisting of laser beam or infrared refraction, or sound acoustics.

29. The method according to claim 24 wherein flux of water through the semi-permeable test membrane is measured by maintaining flow and pressure constant through the monitoring unit, the arrangement being such that any deviation in the flux through the test membrane is attributable to adsorption of impurities onto the test membrane, which changes the permeability characteristic of the test membrane.

30. The use of a monitoring unit including a semi-permeable test membrane for evaluating, by visual and physical inspection, one or more of the following operating parameters in a water purification having a membrane system, the parameters including: the efficiency of different types of chemicals utilized in the having a membrane system, the effect of using different membranes, and/or associated spacers on the operating efficiency in the water purification system, and efficiency of different membrane cleaning methods; the use including the steps of locating the monitoring unit in-line with the water purification system, wherein the monitoring unit comprises a flow chamber having an inlet for permitting the ingress of a feed fluid into the flow chamber, at least one fluid outlet arranged in fluid communication with the flow chamber for permitting the egress of fluid from the monitoring unit, and an inspection window for permitting visual inspection of the test membrane, and a fluid permeable support; placing the semi-permeable test membrane on the fluid permeable support, and effecting at least partial passage of feed fluid through the test membrane to simulate operating conditions of the water purification system in the monitoring unit.

31. The use of a monitoring unit including a semi-permeable test membrane for evaluating, by visual and physical inspection, one or more of the following parameters in a spiral reverse osmosis membrane water purification system, the parameters including: fouling of the spiral membrane; the efficiency of different types of membrane cleaning chemicals utilized in the system; the effect of using different membranes and/or associated spacer means in the water purification system on the operating efficiency of the system; and efficiency of different membrane cleaning methods; wherein the monitoring unit comprises a flow chamber having an inlet for permitting ingress of a feed fluid into the flow chamber; at least one fluid outlet arranged in fluid communication with the flow chamber for permitting egress of fluid from the monitoring unit; and an inspection window for permitting visual inspection of the test membrane; the use including the steps of the monitoring unit in-line with the spiral membrane reverse osmosis water purification system, at least partially supporting the test membrane in the flow chamber and effecting at least partial passage of feed fluid through the test membrane to simulate operating conditions of the water purification system in the monitoring unit.

32. A water purification system including at least one water-cleaning semi-permeable membrane unit, the water purification system characterized therein that it includes a monitoring unit that comprises a flow chamber having a feed fluid inlet for permitting ingress of a feed fluid into the flow chamber, a fluid permeable support member for supporting a semi-permeable test membrane in the flow chamber, the support member constituting a base portion of the flow chamber such that feed fluid entering the flow chamber passes at least in part through the support member, at least one fluid outlet arranged in fluid communication with the flow chamber for permitting egress of fluid from the monitoring unit after having passed through the test membrane; and an inspection window for permitting visual inspection of the semi-permeable test membrane, the inspection window being oriented substantially parallel to and spaced from the support member such that the flow chamber is defined intermediate the support member and the inspection window; the water purification system further being characterized therein that the monitoring unit is located in-line with the water purification system intermediate a feed fluid tank and the at least one water cleaning semi-permeable membrane unit for monitoring fouling of the at least one semi-permeable membrane.

33. The use of a monitoring unit in a water purification system having at least one membrane wherein the monitoring unit comprises a flow chamber having an inlet for permitting ingress of a feed fluid into the flow chamber; a fluid permeable support member for supporting a semi-permeable test membrane in the flow chamber, the support member constituting a base portion of the flow chamber such that feed fluid entering the flow chamber passes at least in part through the support member; at least one fluid outlet arranged in fluid communication with the flow chamber for permitting egress of fluid from the monitoring unit after having passed through the test membrane; and an inspection window for permitting visual inspection of the semi-permeable test membrane; the use including the steps of locating the monitoring unit in-line with the water purification system, placing the semi-permeable test membrane on the fluid permeable support member, and effecting at least partial passage of feed fluid through the test membrane to simulate in the monitoring unit operating conditions of the at least one membrane.

* * * * *

UNITED STATES PATENT AND TRADEMARK OFFICE
CERTIFICATE OF CORRECTION

PATENT NO. : 7,186,331 B2 Page 1 of 1
APPLICATION NO. : 10/090802
DATED : March 6, 2007
INVENTOR(S) : André Maartens et al.

It is certified that error appears in the above-identified patent and that said Letters Patent is hereby corrected as shown below:

Claim 20, Column 9, line 16, "the monitoring is" should read --the manifold is --.

Claim 24, Column 9, line 44, after "egress" delete "of the ".

Claim 30, Column 10, line 14, after "utilized in the" delete "having a membrane".

Signed and Sealed this

Seventh Day of August, 2007

JON W. DUDAS
*Director of the United States Patent and Trademark Office*